(12) United States Patent
Sekar et al.

(10) Patent No.: US 10,967,558 B2
(45) Date of Patent: *Apr. 6, 2021

(54) MACHINE AND METHOD FOR PAINT-ROLLER MANUFACTURING WITH INTEGRATED FINAL CUTTING ONLINE

(71) Applicants: Chandra Sekar, Albertson, NY (US); Santosh Sekar, New York, NY (US)

(72) Inventors: Chandra Sekar, Albertson, NY (US); Santosh Sekar, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/580,662

(22) Filed: Sep. 24, 2019

(65) Prior Publication Data

US 2020/0238599 A1    Jul. 30, 2020

Related U.S. Application Data

(63) Continuation-in-part of application No. 16/261,227, filed on Jan. 29, 2019, now Pat. No. 10,421,229.

(51) Int. Cl.
 *B29C 63/10* (2006.01)
 *B29D 99/00* (2010.01)
 (Continued)

(52) U.S. Cl.
 CPC ........ *B29C 63/105* (2013.01); *B05C 17/0207* (2013.01); *B29D 99/0035* (2013.01);
 (Continued)

(58) Field of Classification Search
 CPC ... B29L 2031/328; B26D 5/007; B29C 53/58; B29C 53/581; B29C 53/60;
 (Continued)

(56) References Cited

U.S. PATENT DOCUMENTS 2,812,007 A * 11/1957 Touchett ............. B05C 17/0207
                                                          156/162
3,150,575 A *  9/1964 Couzens ................... B31C 3/00
                                                          493/12

(Continued)

OTHER PUBLICATIONS

PCT/US20/15675 International Search Report and Written Opinion, dated Apr. 29, 2020, 12 pages.

*Primary Examiner* — Carson Gross
(74) *Attorney, Agent, or Firm* — Wolter Van Dyke Davis, PLLC; Robert L. Wolter

(57) ABSTRACT

A paint roller manufacturing system and method are described. In an embodiment, an inner strip of material and an outer strip of material are wound about a mandrel in offset relation. The inner strip of material and the outer strip of material each comprise material that results in a final paint roller which shrinks by less than 2.5 percent of the final paint roller axial length, or which has shrinkage that varies by less +/−0.1%, upon hardening and setting. An adhesive is applied to at least a portion of the outer strip as it is wound about the mandrel. A length of fabric is wound about at least the outer strip to form a paint roller tube, and compression is applied to the paint roller tube while advancing the paint roller tube in a direction parallel to the mandrel. A precision measuring or sensing device is used to control a cutting device causing the cutting device to cut the advancing paint roller tube into pre-selected lengths prior to the paint roller tube hardening and setting.

28 Claims, 6 Drawing Sheets

(51) Int. Cl.
*B05C 17/02* (2006.01)
*B29L 31/32* (2006.01)
*B29C 53/56* (2006.01)
*B29C 65/00* (2006.01)
*B32B 38/00* (2006.01)

(52) U.S. Cl.
CPC .......... *B29C 53/56* (2013.01); *B29C 66/0326* (2013.01); *B29C 2793/009* (2013.01); *B29C 2793/0081* (2013.01); *B29L 2031/328* (2013.01); *B32B 38/0004* (2013.01); *Y10T 156/1052* (2015.01)

(58) Field of Classification Search
CPC ....... B29C 53/607; B29C 53/62; B29C 53/64; B29C 53/66; B29C 53/665; B29C 53/68; B29C 53/70; Y10T 156/1052
See application file for complete search history.

(56) References Cited

U.S. PATENT DOCUMENTS

| | | |
|---|---|---|
| 5,468,207 A | 11/1995 | Bower |
| 5,537,745 A | 7/1996 | Musch |
| 8,142,587 B2 | 3/2012 | Sekar |
| 8,182,645 B2 | 5/2012 | Sinykin |
| 8,308,884 B2 | 11/2012 | Sekar |
| 8,764,928 B2 | 7/2014 | Sekar |
| 8,882,957 B2 | 11/2014 | Sinykin |
| 9,956,719 B1 | 5/2018 | Sekar |
| 10,421,229 B1* | 9/2019 | Sekar .................... B29C 53/566 |
| 10,576,682 B2 | 3/2020 | Sekar |
| 2003/0201060 A1* | 10/2003 | Hauber .................... B32B 1/08 156/172 |
| 2010/0064869 A1 | 3/2010 | Poole |
| 2010/0282401 A1* | 11/2010 | Sekar ................ B29D 99/0032 156/190 |

* cited by examiner

MACHINE AND METHOD FOR PAINT-ROLLER MANUFACTURING WITH INTEGRATED FINAL CUTTING ONLINE

CROSS-REFERENCE TO RELATED APPLICATION

This application is a Continuation-In-Part of and claims the benefit of U.S. patent application Ser. No. 16/261,227, filed Jan. 29, 2019, titled Machine and Method For Paint-Roller Manufacturing With Integrated Final Cutting Online, which is incorporated by reference herein in its entirety.

FIELD

The present invention relates in general to the field of paint roller manufacturing, and in particular to a novel machine and process for cutting operations in the manufacture of paint rollers.

BACKGROUND

Paint roller manufacturing typically involves multiple stages. By the late 1980s, and into the 1990s commercially viable methods of manufacturing thermoplastic paint rollers were developed. See, e.g., U.S. Pat. Nos. 5,195,242, 5,572,790 having a common inventor herewith. These patents describe continuous processes of manufacturing paint roller sticks. Sticks are several times the length of a finished paint roller. Thermoplastic paint rollers used heat or molten plastic materials in the process of manufacturing paint roller sticks. For example, many processes used molten polypropylene or molten polypropylene compounds with melting points in excess of 300 degrees Fahrenheit.

Sticks are typically 65 inches long when they come off a production line (e.g., as the end product of a continuous production line) at an elevated exterior temperature. For example, a stick may be cut from the output of a continuous processing line with an exterior temperature that is greater than about 90 degrees Fahrenheit, or greater than about 100 degrees Fahrenheit, or greater than about 110 degrees Fahrenheit. Internal components of the sticks may remain much hotter than the exterior temperature when cut.

After manufacture, the sticks are allowed to cool, harden and set over time. During the cooling, hardening and setting processes, the sticks shrink, often substantially, e.g., more than about an inch, or more than about 1.5 inches. Indeed, it is likely that the principal reason for the historical selection of 65 inches as the industry standard stick length is the ability to cut seven 9-inch paint rollers (which is a very popular size) therefrom, after shrinkage. After the sticks are hardened and set, and thus have shrunk, they are cut down to final paint-roller lengths. In an embodiment, a typical paint roller length may be 3, 4, 6, 7, 9, 12, 15, or 18 inches long. Other lengths (e.g., metric lengths) may be used as well. As an illustration, a 65-inch stick that has hardened and set may have shrunk by well over an inch, but it can still be cut into to seven 9-inch paint rollers. Other typical stick sizes may be used (i.e., other than 65 inches) for making 9-inch or other roller sizes, however, all sticks are sized to allow for substantial shrinkage and result in waste in the cutting process.

Prior to the invention described herein it was well known to persons skilled in the art that cutting a paint roller stick into paint rollers of final length should not be done until all or substantially all of the (axial and radial) shrinkage has occurred. Thus, typically, final cutting of paint rollers would not be performed until the stick has hardened and set. For example, final cutting may be performed when the exterior surface of the stick has a temperature of less than 90 degrees Fahrenheit or less than 100 degrees Fahrenheit.

BRIEF DESCRIPTION OF THE DRAWINGS

Objects, features, and advantages of the invention will be apparent from the following description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
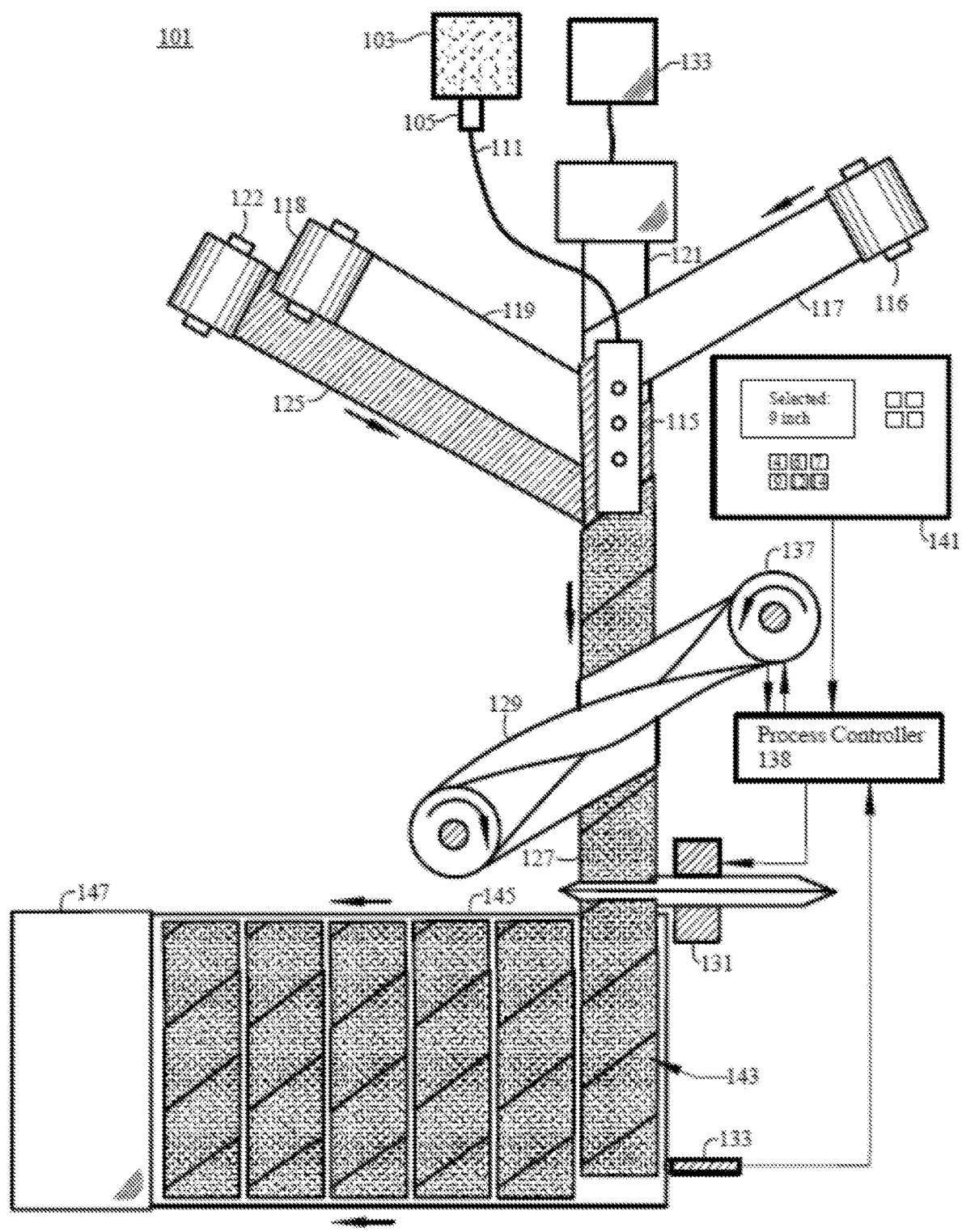
FIG. 1 shows a top view illustrating a machine and two-strip process for manufacturing paint rollers in accordance with an embodiment wherein paint rollers are manufactured and cut to final length in a single process.

Reference will now be made in detail to the preferred embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment, and such references mean at least one.

In a two-strip embodiment of the process, an inner strip of material and an outer strip of material are wound about a mandrel in offset relation, the inner strip of material and the outer strip of material each comprising polypropylene or a polypropylene compound including polypropylene and at least one filler.

According to various embodiments, the paint roller may comprise a material or a combination of materials selected to result in a shrinkage (between the cut length of paint roller and the final hardened-and-set length) of less than about 2.5%. In an embodiment, the materials used may be selected to reduce roller-to-roller variation in shrinkage to within manufacturing tolerances, such as to less than about one tenth of 1 percent (0.1%). According to various embodiments, the materials may include a combination of a filler and a polymeric material.

According to various embodiments, the filler may be selected from Alumina Trihydrate, Barium Sulfate, Calcium Carbonate, Carbon Black, Diatomaceous earth, Dolomite, Halloysite, Kaolin, Magnetite/Hematite, Magnesium Hydroxide, Mica, Silica, Talc, Titanium Dioxide, Wollastonite, Zinc Oxide.

According to various embodiments, the filler may have a density within a range having a lower limit and/or an upper limit. The range may include or exclude the lower limit and/or the upper limit. The lower limit and/or upper limit may be selected from about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, and 7 g/cm$^3$. For example, according to certain embodiments, according to various embodiments, the filler may have a density of from about 1 to about 6 g/cm$^3$, or any combination of lower limits and upper limits described.

According to various embodiments, the filler may have an average particle size within a range having a lower limit and/or an upper limit. The range may include or exclude the lower limit and/or the upper limit. The lower limit and/or upper limit may be selected from about 0.001, 0.005, 0.01, 0.05, 0.1, 0.5, 1, 5, 10, 100, 200, 300, 400, 500, 600, 700, 800, 900, and 1000 microns. For example, according to certain embodiments, according to various embodiments, the filler may have an average particle size of from about 0.001 to about 1000 microns, or any combination of lower limits and upper limits described.

According to various embodiments, the polymeric material may be a thermoplastic, a thermoset, an elastomer, a copolymer thereof, and/or a blend thereof. The polymeric material may have any suitable molecular weight. The polymeric material may further comprise one or more additives including plasticizers to modify various properties of the polymeric material including but not limited to interactions between polymer chains, glass transition temperature, melt viscosity, and/or elastic modulus. The polymeric material may be a commercially-available virgin or non-virgin grade.

According to various embodiments, the thermoplastic material may be crystalline or amorphous. According to various embodiments, the thermoplastic may be selected from a polypropylene, a poly(methyl methacrylate), an acrylonitrile butadiene styrene polymer, a polyamide, a polylactic acid (polylactide), a polybenzimidazole, a polycarbonate, a polysulfone, a polyoxymethylene, a polyether ether ketone, a polyetherimide, a polyethylene, a polyethylene terephthalate, a polyphenylene oxide, a polyphenylene sulfide, a polypropylene, a polystyrene, a polyvinyl chloride, a polyvinylidene fluoride, a polytetrafluoroethylene, or combinations thereof.

According to various embodiments, the thermoset may be selected from a polyester, a polyurethane, a polyurea, vulcanized rubber, a phenol-formaldehyde resin, a melamine resin, and epoxy resin, a benzoxazine, a polyimide, a polycyanurate, a furan resin, a silicone resin, a vinyl ester resin, or a combination thereof.

According to various embodiments, the elastomer may be selected from a polyisoprene, a polybutadiene, a polychloroprene, a butyl rubber, a halogenated butyl rubber, a styrene-butadiene rubber, a nitrile rubber, an ethylene propylene rubber, an epichlorohydrin rubber, a polyacrylic rubber, a silicone rubber, a fluorosilicone rubber, a fluoroelastomer, a perfluoroelastomer, a polyether block amide, a chlorosulfonated polyethylene, an ethylene-vinyl acetate, or a combination thereof.

The amount of filler present in the combination (of filler and polymer material) may be within a range having a lower limit and/or an upper limit. The range may include or exclude the lower limit and/or the upper limit. The lower limit and/or upper limit may be selected from about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, and 75% by weight. For example, according to certain embodiments, the amount of filler present in the combination (of filler and polymer material) may be in a range from about 10 to about 70% by weight, or any combination of lower limits and upper limits described.

In an embodiment, the materials used are selected to result in a shrinkage of less than 0.6% or 0.05 inches for a 9" paint roller. In an embodiment, the materials used should be selected to reduce roller-to-roller variation in shrinkage to within manufacturing tolerances, such as to less than 0.013% or 0.001 inches for a 9" roller. In an embodiment, the materials used are selected to result in a shrinkage of less than 1.2% or 0.1 inches for a 9" paint roller. In an embodiment, the materials used should be selected to reduce roller-to-roller variation in shrinkage to within manufacturing tolerances, such as to less than 0.026% or 0.002 inches for a 9" roller. In an embodiment, the materials used are selected to result in a shrinkage of less than 2.4% or 0.2 inches for a 9" paint roller. In an embodiment, the materials used should be selected to reduce roller-to-roller variation in shrinkage to within manufacturing tolerances, such as to less than 0.052%, or 0.004 inches, for a 9" roller. Applying the foregoing to an 18 inch paint roller, in an embodiment, the materials used should be selected to result in a shrinkage of less than 0.11 inches or less than 0.22 inches, or less than 0.33 inches. In an embodiment, the materials (e.g., proportions of polypropylene to filler) are selected to result in a final paint roller shrinkage which is repeatable. In an embodiment, the materials are selected to result in a final paint roller shrinkage which is repeatable within normal manufacturing tolerance (i.e., that the finished paint rollers manufacture with the materials harden and set to the finished length within manufacturing tolerance.)

Shrinkage also occurs radially, in addition to axially as discussed above. In other words, there is some reduction in paint roller diameter due to shrinkage. Rollers manufactured with a compound that includes a filler, as described herein, shrink less than traditional polypropylene-only rollers. Polypropylene-only rollers are typically made with an internal diameter of 1.52", and shrink to a finished internal diameter of 1.485", which represents a shrinkage of about 2.3%. Rollers manufactured with a compound that includes a filler are typically made with an internal diameter of 1.5", and they shrink to 1.485", which represents a shrinkage of about 1%. Mini rollers, which typically have a length of 4.5 inches and a diameter of 0.5 inch or ¾ inch, or a length of 6.5 inches and a diameter of 0.5 inch or ¾ inch, are subject to similar shrinkage. Therefore, rollers of all sizes made with such compounded material shrink less, typically more than 50% less, than paint rollers made solely from the more traditional polypropylene material.

In an embodiment of the present invention, an adhesive is applied to at least a portion of the outer strip as it is wound about the mandrel, a length of fabric is wound about at least the outer strip to form a continuous paint roller tube, and compression is applied to the paint roller tube. The paint roller tube may be cut into pre-specified lengths inline with the manufacturing process prior to the paint roller tube hardening and setting. In an embodiment, a precision measuring and/or sensing device is used to control a cutting device so as to cut the paint roller tube into pre-specified lengths prior to the paint roller tube hardening and setting. In an embodiment, a measuring and/or sensing device controls a cutting device which cuts the continuous paint roller tube into pre-specified lengths inline with the paint roller tube manufacturing process prior to the paint roller tube hardening and setting. The cut lengths of paint roller tubes are subsequently allowed to harden and set. In an embodiment, the hardened and set cut paint roller tube is the desired length of a paint roller. In an embodiment, the hardened and set cut paint roller tube is the desired length of a paint roller, within normal manufacturing variation.

FIG. 1 illustrates a two-strip embodiment of a paint roller manufacturing system 101 for implementing the above process. The system includes a cover dispenser 122 that continuously dispenses a windable width of paint roller cover fabric 125, the paint roller cover fabric having a back side and an applicator side. The paint roller cover fabric 125 may comprise a conventional cover fabric or a coated fabric that has been coated offline or online, as is taught in U.S. Pat. No. 9,956,719 which is incorporated by reference herein in its entirety and shares a common inventor herewith.

A mandrel 121 is provided, and may be cooled by a mandrel cooler 133 so as to facilitate movement of strips around the mandrel in a helical manner without adhesion of the strips to the mandrel and with lower resistance.

First and second strip dispensers 116, 118 are configured to continuously dispense first and second windable widths of strip material 117, 119. A guide system (not shown) may be used to guide the first and second strip coming from the first and second strip dispensers such that it is wound about the mandrel and to guide a paint roller cover fabric to be wound about the first and second strips 117, 119. In an embodiment, the paint roller fabric cover may be coated. In an embodiment, the paint roller fabric cover may be perforated. In an embodiment, the paint roller fabric cover may be coated and perforated. The second strip 119 and/or the first strip 117 may be a solid strip, a perforated strip or an embossed strip (e.g., having recessed dimples or other recessed features).

In an embodiment, the cover fabric 125 has been perforated in order to increase adhesion of the fabric to the outer strip in a two-strip process, or to the sole strip in a single-strip process. Methods and devices for perforating cover fabrics are taught, for example, in U.S. patent application Ser. No. 16/103,550 filed Aug. 14, 2018, which shares a common inventor herewith and is incorporated herein by reference in its entirety. Paint roller fabric can either be perforated in the paint roller manufacturing process, or at any time prior to the fabric being wound around the mandrel, such as when the fabric is manufactured. In an embodiment, perforating paint roller fabric may provide for greater adhesion and/or a reduction in shedding (i.e., the amount of fibers that are dislodged during the paint roller manufacturing process or the process of using a finished paint roller).

In an embodiment, an applicator 115 is configured to apply adhesive (which may be glue, a polymer, or a compound polymer with or without a filler material) on substantially all of the outer side of the first and second windable strips 117, 119 upstream of a location where the conventional or coated paint roller cover fabric 125 is wound about the first and second strips. In an embodiment, the adhesive is in a molten state or a liquified state when applied. In an embodiment, the adhesive is molten or liquified polypropylene. In an embodiment, the adhesive is molten or liquified compound which includes polypropylene. In an embodiment, the adhesive is molten or liquified compound which includes polypropylene and calcium carbonate.

In an embodiment, a compressing and advancing device 129 is provided for applying inward pressure normal to the mandrel on a conventional or coated paint roller fabric cover 125 after it is wound about the first and second strips 117, 119, and for advancing the first and second windable strips and the paint roller fabric cover along the mandrel 121. As discussed above, the paint roller fabric cover may be conventional, coated, perforated, or coated and perforated.

In an embodiment, the machine includes an extruder 103, which may be configured for extrusion of an adhesive material through a die 105. In an embodiment, the material is molten when it is extruded through the die 105 and the molten material is pushed through hose 111 to the strip-coating adhesive applicator 115. The strip-coating applicator 115 may comprise any device for applying liquid adhesive to a fabric, including a die head, sprayer, brush, extruder, or the like.

The inner strip 117 and outer strip 119 of material are helically wound about the mandrel 121 in offset relation. In an embodiment, the offset relation is approximately 50%, that is, the center of one strip wraps at a location under or over (as the case may be) the middle of the other strip. In an embodiment, the offset relation is at least 5% to prevent the seams of the inner strip and the outer strip from aligning. A 5% offset relation refers to having the seam at least 5% of the width of the strip away from the edge of the strip. In an embodiment, the entire inner surface of the inner strip 117 contacts the mandrel 121. In an embodiment, no portion of the outer strip 119 contacts the mandrel 121.

In an embodiment, the inner strip 117 and the outer strip 119 comprise a material that, for a given roller length, will result in repeatable shrinkage due to hardening and setting. In an embodiment, the inner strip 117 and the outer strip 119 comprise a material that, for a given roller length, will result in repeatable shrinkage due to hardening and setting, within a manufacturing tolerance.

In an embodiment, the outer surface of the inner strip 117 and the outer surface of the outer strip 119 are coated with adhesive by the strip-coating applicator 115. In an embodiment (not shown), the strip-coating applicator 115 comprises two separate strip-coating applicators, one to coat each of the two strips 117, 119. Thus, such coating of the outside of each of the two strips may be performed by the same applicator or, in another embodiment, by two separate applicators. As shown in FIG. 1, coating of the strip or strips is performed by a single applicator. In an embodiment, only the outer surface of the inner strip 117 is coated with adhesive by the strip-coating applicator 115. In an embodiment, the strip-coating applicator 115 applies adhesive to either the outer surface of the inner strip or the inner surface of the outer strip such that the adhesive ends out between the inner and outer strips after it is applied. In an embodiment, the strip-coating applicator 115 applies adhesive to either the outer surface of the inner strip or the inner surface of the outer strip such that the adhesive ends out between the inner and outer strips after it is applied, and liquid adhesive applied by an optional fabric coating applicator is not set when the outer strip 119 and the fabric cover 125 come together on the mandrel. In an embodiment, the strip-coating applicator 115 applies adhesive to either the outer surface of the outer strip or the inner surface of the fabric cover 125 such that the adhesive ends out between the outer strip and fabric after it is applied. In an embodiment, a portion of the outer surface (rather than the entire outer surface) of the outer strip 119 (or the only strip in a single-strip embodiment) is coated with adhesive. In an embodiment, the entire outer surface of the outer strip 119 is coated with adhesive.

The strip-coating applicator 115, in each case, may be configured to apply a contiguous or non-contiguous coat of material to the strip. Examples of a non-contiguous coat include, without limitation, a mesh of material, or stripes of coating material. In addition, the strip-coating application may be configured to apply additional material, such as a mesh material in addition to a coating material. In an embodiment, a mesh material and a contiguous coat of material are applied by the strip coating applicator 115. In an embodiment, the mesh material is a resin. In an embodiment, the mesh material is an adhesive mesh. In an embodiment, only a portion of the outer surface of the inner strip 117 is coated with adhesive. In an embodiment, the entire outer surface of the inner strip 117 is coated with adhesive.

In an embodiment, the strips and/or adhesive are made from or comprise polypropylene. In an embodiment, the strips and/or adhesive comprise a compound of polypropylene and a filler. In an embodiment, the filler comprises calcium carbonate. A variety of formulations for strips and/or adhesive may be found, e.g., in Applicant's U.S. patent application Ser. No. 14/789,723 filed Jul. 1, 2015 and the references cited therein, the entire disclosures of which are incorporated herein by reference. It is not necessary to use strips of identical materials. It is similarly not necessary to employ an adhesive of similar materials to one or both of the strips.

In an embodiment, the material used for both or either of the strips may comprise, for example: (1) commonly-available polypropylene; (2) a blend of polypropylene, with an effective Melt Flow Rate (MFR) of 2-20 g/10 min.; (3) a combination of calcium carbonate ($CaCO_3$) and Polypropylene, with $CaCO_3$ ranges used from 10-70% $CaCO_3$; or (4) a combination of calcium carbonate ($CaCO_3$) and a blend of polypropylenes, with $CaCO_3$ ranges used from 10-70% $CaCO_3$.

In an embodiment, the material used for the adhesive may comprise, for example: (1) commonly-available polypropylene; (2) a blend of polypropylene, with an effective Melt Flow Rate (MFR) of 20-180 g/10 min.; (3) a combination of calcium carbonate ($CaCO_3$) and Polypropylene, with $CaCO_3$ ranges used from 10-70% $CaCO_3$; or (4) a combination of calcium carbonate and blend of polypropylene (having a high MFR ranging from 700-1400 g/10 min), with $CaCO_3$ ranges from 10-70% $CaCO_3$ by weight, for an effective total MFR of 20-180 g/10 min. In an embodiment, the adhesive comprises a combination of calcium carbonate and blend of polypropylene, the combination having an effective MFR within the range of 20-180 g/10 min. In an embodiment, the adhesive comprises a combination of calcium carbonate and blend of polypropylene, the combination having an effective MFR within the range of 80-170 g/10 min. In an embodiment, the adhesive comprises a combination of calcium carbonate and blend of polypropylene, the combination having an effective MFR within the range of 160-175 g/10 min.

Figure 5:
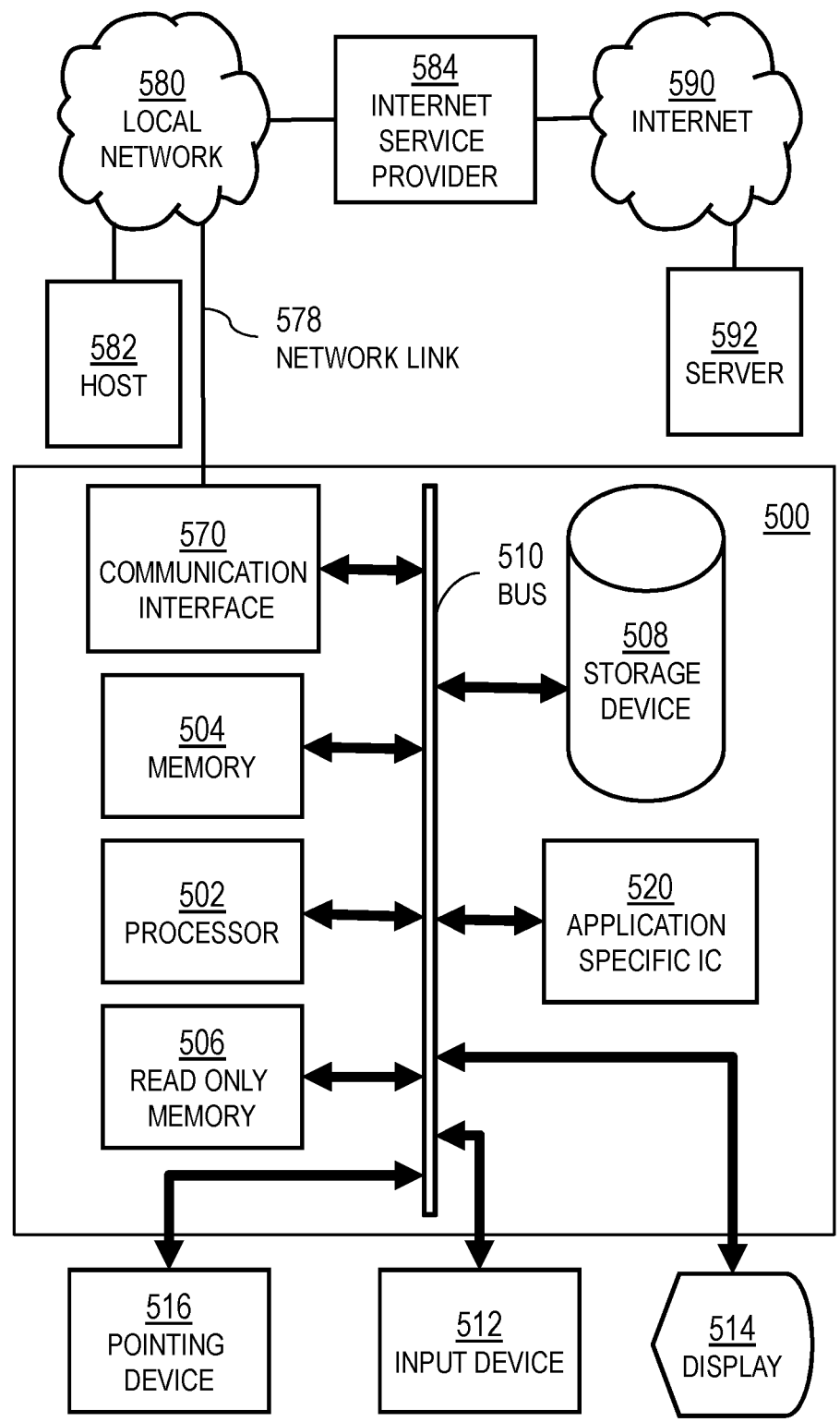
FIG. 5 is a block diagram that illustrates a computer system upon which an embodiment of the invention may be implemented.

Once the component parts (e.g., strips, adhesive, cover) are wound about the mandrel 121, the in-process paint roller cover material tube 127 may be driven by a motorized compressing and advancing device. In an embodiment, the in-process paint roller cover material tube 127 is driven by a compressing and advancing device comprising a belt 129 driven by a motorized roller 137. Operation of the motorized roller 137 may be controlled by a process controller 138 in one-way or two-way communication with the motorized roller 137. According to various embodiments, the process controller 138 may comprise a computer system 500 as illustrated in FIG. 5.

The formed paint roller cover material tube 127 is advanced along the mandrel 121 by the belt 129 to a cutting device 131 that cuts the tube into lengths. The cutting device 131 may be, e.g., a rotary cutter, a flyaway saw, a traveling saw, a stationary cutter, or other suitable cutter or chopper. In an embodiment, the cutting device is under the control of the process controller 138.

The process controller receives a signal from a precision measuring and/or sensing device 133, the signal indicating that the tube 127 has advanced to a particular point either along or after the mandrel 121. The precision measuring and/or sensing device 133 may be, e.g., a mechanical, optical, electromagnetic, Hall effect, piezoelectric, or magnetic sensor capable of measuring a desired length of the tube 127, or detecting or determining a location of the tube 127 with sufficient precision, accuracy, and speed to allow the cutting device 131 to cut the tube 127 such that once set, the cut lengths result in tubes in a desired length (e.g., a paint roller length) within a manufacturing tolerance. In an embodiment, such tolerance is less than 0.001 inches per final paint roller length. In an embodiment, such tolerance is less than +/−0.002 inches. In an embodiment, such tolerance is +/−0.004 inches. In an embodiment, such tolerance comprises shrinkage of less than 0.05 inches per final paint roller length. In an embodiment, such tolerance comprises shrinkage of less than 0.10 inches per final paint roller length. In an embodiment, such tolerance comprises shrinkage of less than 0.20 inches per final paint roller length. In an embodiment, such tolerance comprises shrinkage which varies by less than 0.004 inches per final paint roller length. In an embodiment, such tolerance comprises shrinkage which varies by less than 0.8 percent of the final paint roller length.

The precision measuring and/or sensing device 133 is illustratively shown in FIG. 1 downstream from the cutting device 131, however, the precision measuring and/or sensing device 133 may be located at virtually any part of the machine where there is movement proportional to the manufacturing process. In an embodiment, the precision measuring and/or sensing device 133 is located at a part of the machine past which the tube 127 is moving. In an embodiment, the precision measuring and/or sensing device 133 is located at a part of the machine past which one or more of the strips 117, 119 or cover 125 are moving. In an embodiment, the precision measuring and/or sensing device comprises a shaft encoder on the shaft of motorized roller 137. In an embodiment, the precision measuring and/or sensing device comprises a shaft encoder on the shaft of one or more of rollers 116, 118, and 122. In an embodiment, the precision measuring and/or sensing device comprises a wheel in contact with either strips 117, 119, or cover 125, or any combination of those components. In an embodiment, the precision measuring and/or sensing device comprises a wheel in contact with the tube 127.

The process controller 138 is in communication with a selection interface 141, which may comprise hard buttons and/or a touch interface with soft buttons, that allow selection of final paint roller length. According to various embodiments, the selection interface may comprise an input device 512, a display 514, and/or a pointing device 516 as illustrated in FIG. 5. The selection interface 141 is in direct or indirect communication with the cutting device 131 and/or the precision measuring device 133, and is configured to allow an operator to select the final paint roller length from one of a plurality of preset lengths to another of the plurality of preset lengths. Examples of such preset lengths include, e.g., three inches, four inches, four and a half inches, six inches, six and a half inches, seven inches, nine inches, twelve inches, fifteen inches, and eighteen inches. Based on such selection, and the signal from the precision measuring device 133, the process controller 138 causes the cutting device 131 to be actuated with a specific timing that results in the length of the final paint rollers 143 to be at or near a length selected using the selection interface 141. The functions of the process controller may be incorporated in whole or in part in other sensing, detecting, or computational components already in use elsewhere in the process.

Once rollers have been cut via the above-described inline cutting process, they can be conveyed via a conveyor 145 to a finishing machine 147 where they are finished. In an embodiment, finishing includes beveling the edges of the final roller, trimming excess fabric, and removing any detritus/debris. Finishing may include any other process that a manufacturer requires before rollers are placed into packaging, and may include placement into packaging. In an embodiment, conveyor 145 comprises a conveyor belt with short walls on either side.

The rollers can then be loaded into a loading mechanism such as a magazine. The process may further utilize an apparatus that evenly distributes the rollers to a number of downstream finishing machines, based on various methods used to sense the current capacity/queue at each of the machines. Various methods can be utilized for assessing how "busy" a finishing machine is. Such methods include, e.g., receiving and processing signals from electromechanical sensors, optical sensors, or operator input.

In an embodiment, the finishing machine 147 includes a queuing station and an indexing device. Once a roller has been deposited at the queuing station of the finishing machine, the finishing process can begin. The indexing device is used to finish rollers using functions performed at each of a plurality of different stations selected per the particular manufacturer's finishing requirements.

There are two main types of indexing machines, single-turntable machines and dual-turntable machines. Single-turntable indexing machines typically utilize a single rotary turntable that turns a roller through a plurality of stations. For example, a six-station machine would load, spin, buff, bevel, spin, and unload a roller. Spinning is used to remove excess particles from fibers. One of the main issues with a single-turntable process is that it typically is unable to easily process a roller on both ends (i.e., the end of the roller that is closest to the indexing turntable is hard to reach). A dual-turntable indexing machine, on the other hand, allows rollers to be finished at both ends, using two sets of turntables. One example of a machine of this type uses two eight-station turntables that would each load, buff, bevel, shear, clean ends, spin, (an ancillary action), and unload the roller. Either type of finishing machine is also capable of tucking in excess fabric on one end of the roller to increase the surface area of the roller that can be exposed to paint, or for aesthetic purposes.

As an alternative to or in addition to using a finishing machine, roller fabric can be pre-finished by cleaning, shearing, vacuuming, de-linting, or otherwise manipulating it inline before it is wound around a mandrel or otherwise applied to a core as a part of any paint roller manufacturing process. The fabric can be treated either before it is applied to a core, or even after the fabric has been applied to the core, and before the roller cores are cut to desired lengths. Finishing processes other than beveling and spinning can be performed prior to roller cores being cut to desired lengths.

In an embodiment, roller cores are marked with a day/date code or other identifying codes/marks on the inside portion of the core. In an embodiment, marking can be accomplished by laser marking strip material 117, 119 (composed of any material) before it is wound around the mandrel, or by laser marking the core of any tube after rollers are cut to length. The printing/laser marking/burning of the code can also take place during the finishing process, potentially as a separate station of the process, or this function can be incorporated into a finishing station of the finishing machine 147.

In an embodiment, a method for manufacturing paint rollers includes winding an inner strip of material and an outer strip of material about a mandrel in offset relation, the inner strip of material and the outer strip of material each comprising polypropylene or polypropylene and at least one filler in proportions of polypropylene to filler that result in final paint roller shrinkage of less than 0.015 inches per inch of final paint roller length or less than 0.87 percent of the final paint roller length. An adhesive is applied to at least a portion of the outer strip as it is wound about the mandrel. A length of fabric is wound about at least the outer strip to form a paint roller tube, and compression is applied to the paint roller tube. A precision measuring or sensing device is used to control a cutting device so as to cut the paint roller tube into final paint roller lengths online with the paint roller tube manufacturing process and prior to the paint roller tube being allowed to harden and set. In an embodiment, the proportions of polypropylene to filler may result in final paint roller shrinkage of less than 0.010 inches per inch of final paint roller length, less than 0.006 inches per inch of final paint roller length, or less than 0.004 inches per inch of final paint roller length.

The methods and system are described above in the context of a two-strip process for manufacturing paint rollers. One skilled in the art will recognize that the same or similar methods can be used in a single-strip process, a three-strip process, or the like, without departing from the spirit and scope of the invention.

It is within the scope and spirit of the inventions described herein that a continuous process of manufacturing paint rollers employs a cutter to cut the in-process semi-finished continuous tube of paint roller material prior to setting. It is also within the scope and spirit of the inventions described herein that the length of material that is cut from the continuous tube of paint roller material includes the length of the desired finished paint roller plus a predetermined amount or range of shrinkage which will permit the cut length to harden and set to a finished length within a manufacturing tolerance. In an embodiment, the predetermined amount of shrinkage may be determined empirically, by operating the process over a known cut size, or a range of cut sizes and measuring the cutting results after they have hardened and set to substantially their final size. In an embodiment, the predetermined amount of shrinkage may be determined through calculation from known shrinkage properties of each of the relevant constituent materials. Despite the hundreds of millions of thermoplastic paint rollers made each year for at least the last twenty years or more, no known paint rollers have been continuously manufactured to finished length solely by cutting the continuously manufactured paint roller tube to a prespecified larger size, and allowing the cut section to harden and set, and thereby shrink. Regardless of the method of determining the predetermined amount of shrinkage, using an enlarged cut size to accommodate the predetermined shrinkage has heretofore not been taught or suggested.

Figure 2:
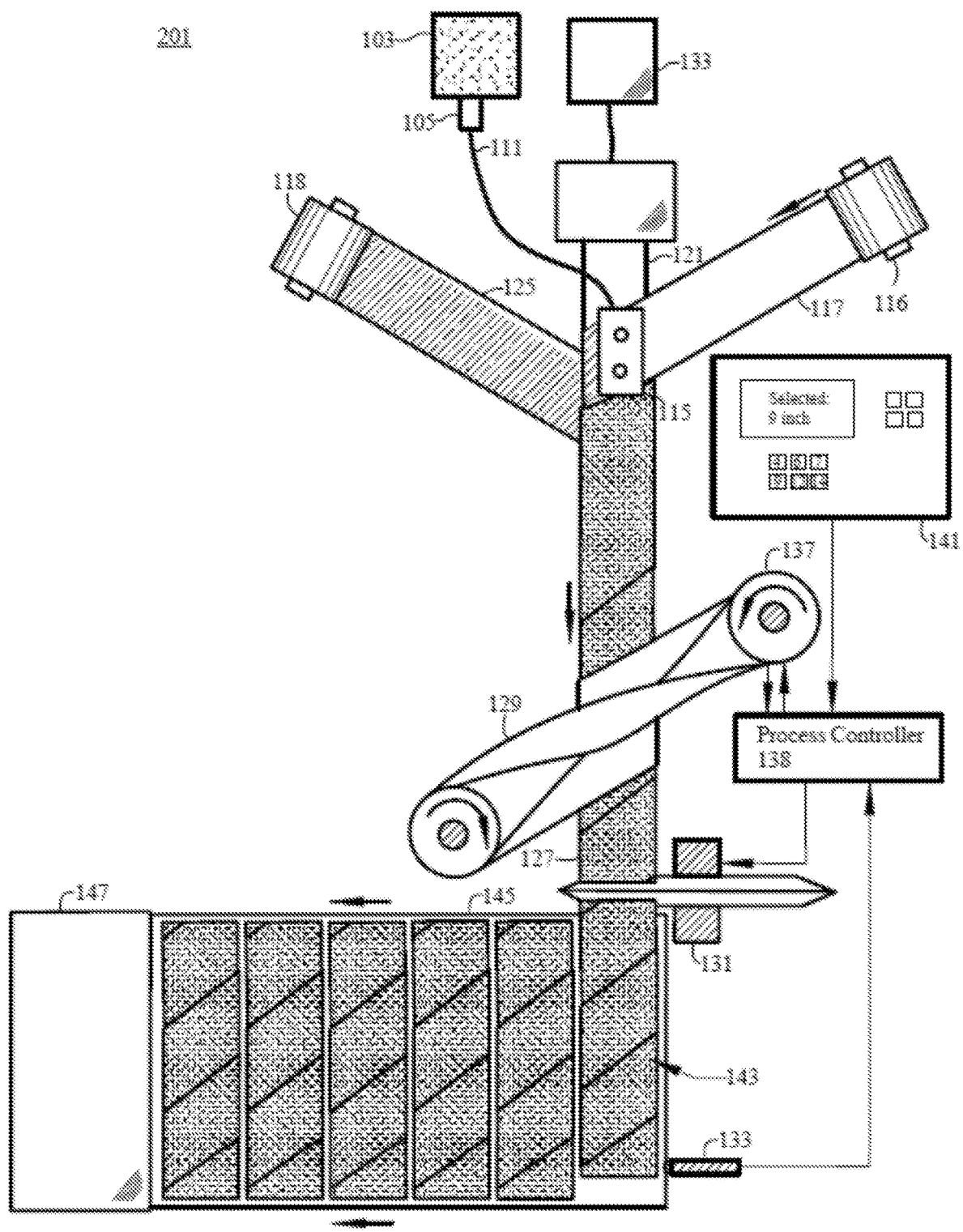
FIG. 2 shows a top view illustrating a machine and one-strip process for manufacturing paint rollers in accordance with an embodiment wherein paint rollers are manufactured and cut to final length in a single process.

FIG. 2 shows a single-strip embodiment 201 of the two-strip machine and process shown in FIG. 1. This embodiment generally operates as per the descriptions of FIG. 1 above, except that a single strip 117 is used instead of the dual strips 117 and 119.

With respect to the process controller 138, the selection interface 141, and the precision measuring device 133 shown in FIGS. 1 and 2 and discussed above, it is noted that roller lengths can also be measured via a device that uses a mechanical switch that is triggered by the forward motion of the roller tube, or the presence of the roller tube. The mechanical switch, or any other apparatus that is used to measure the presence of the roller, can be positioned at arbitrary or preset lengths in order to allow operators to quickly change the desired length of the roller tube between preset desired lengths. Markers, mechanical stops, and/or other physical or virtual demarcation devices can be placed inline with respect to roller tube travel, or parallel or perpendicular to the direction of roller tube travel. Physical/virtual preset length stops or other demarcations can be used in conjunction with or in lieu of a selection device and/or a processor controller. An embodiment of such method and system is illustrated in FIG. 3.

Figure 3:
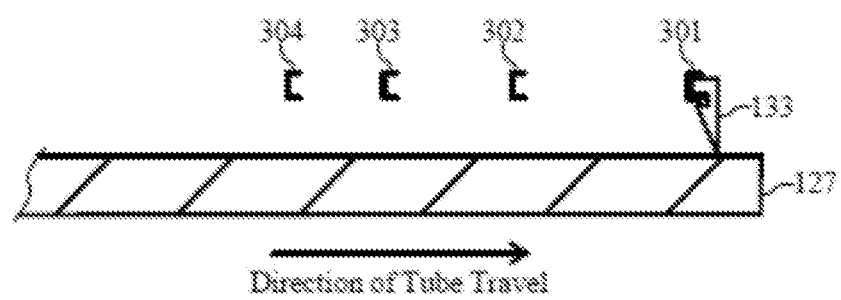
FIG. 3 shows a paint roller tube traveling through a machine past a series of notches into which one or more sensors and/or switches are inserted.

FIG. 3 shows a paint roller tube 127 traveling through a machine past a series of preset notches 301, 302, 303, 304 into which one or more sensors 133 is inserted. The preset notches 301, 302, 303, 304 correspond to different paint roller lengths, e.g., three inch, six inch, nine inch and 12 inch. In an embodiment the sensor 133 is a "flipper" switch is triggered whenever the roller tube is pushed against it via forward motion. The switch 133 can be positioned at preset or arbitrary intervals that allow the operator to quickly change the switch's position between desired lengths. In this manner, the triggering/sensing device that is utilized can be positioned precisely where the manufacturer desires to position it. Instead of using a switch, an optoelectronic array, Hall effect device, or other suitable sensor or measuring device could be used.

In addition to embodiments wherein a trigger is moved, other embodiments can utilize radar or other non-contact measuring devices to measure a length of roller tube as it passes by the scanning area of the manufacturing system. The length can be continually assessed, and once the device decides that the length is adequate as per operator instructions, the device then sends a signal to cut. All devices can either communicate with an intermediary process controller, or directly with the cutting device itself.

Advantages of the present invention over the present inventor's prior patents include, but are not limited to the following. It should be noted that some but not all embodiments of the present invention provide each of these advantages. The present invention can provide a single-step in-line process for manufacturing a paint roller using inline cutting, rather than a two-step offline process, thereby reducing the amount of time, resources, labor, machinery, and waste materials required to produce paint rollers in final lengths. Machines operating according to the present invention can be configured to use less expensive molten material that includes one or more fillers. In addition to not requiring additional labor, space, and time to deal with roller tubes as opposed to rollers cut to desired final lengths, other benefits include:

If roller tubes are constructed of materials that reduce roller tube shrinkage relative to materials that experience greater shrinkage (as described above), waste is reduced, and thus, less material is required to make each paint roller. Historically, 65 inch tubes were produced because up to one inch of shrinkage was expected, and because one inch of material was needed to accommodate imprecision in the cutting process. Although using a compounded polypropylene material reduced shrinkage, it did not reduce waste because manufacturers have continued to manufacture paint rollers by producing 65" sticks. Indeed, persons of ordinary skill in the art failed to recognize the benefits of the present invention, which may dramatically reduce waste.

Eliminating the need for recutting—that is, to cut rollers to desired lengths from sticks—saves both capital and labor costs associated with owning and operating the equipment needed to cut sticks into paint rollers of exact lengths. Eliminating the need for recutting also saves the cost of storage space that was taken up by intermediary storage of roller tubes and the recutting equipment.

Overall manufacturing time decreases with the elimination of recutting paint roller tubes.

It is noted that the last two benefits accrue to anyone that uses inline paint roller cutting with any paint roller manufacturing process, including spiral-winding processes using any strip and resin material, and any non-spiral-winding processes. With respect to non-spiral winding processes, the methods and systems described herein can be used for inline cutting with processes such as those that use extruded tubes. Extruded tubes can be pre-fabricated before the paint roller manufacturing process or extruded as part of the paint roller manufacturing process. This includes extruded tubes that rotate as they are made inline.

Although reference has been made to specific paint roller manufacturing techniques, various embodiments of cutting paint rollers to specified lengths may be performed with any paint roller manufacturing system where tubes, comprised of any sufficiently rigid material, are moved through a manufacturing line using forward motion. The motion can be linear or rotational. The term "paint roller tube" refers to a tube of material or a tube comprised of a combination of materials that may or may not have paint roller fabric or other materials, such as lambskin, applied to it. These paint roller tubes are then cut to desired individual roller lengths.

Figure 4:
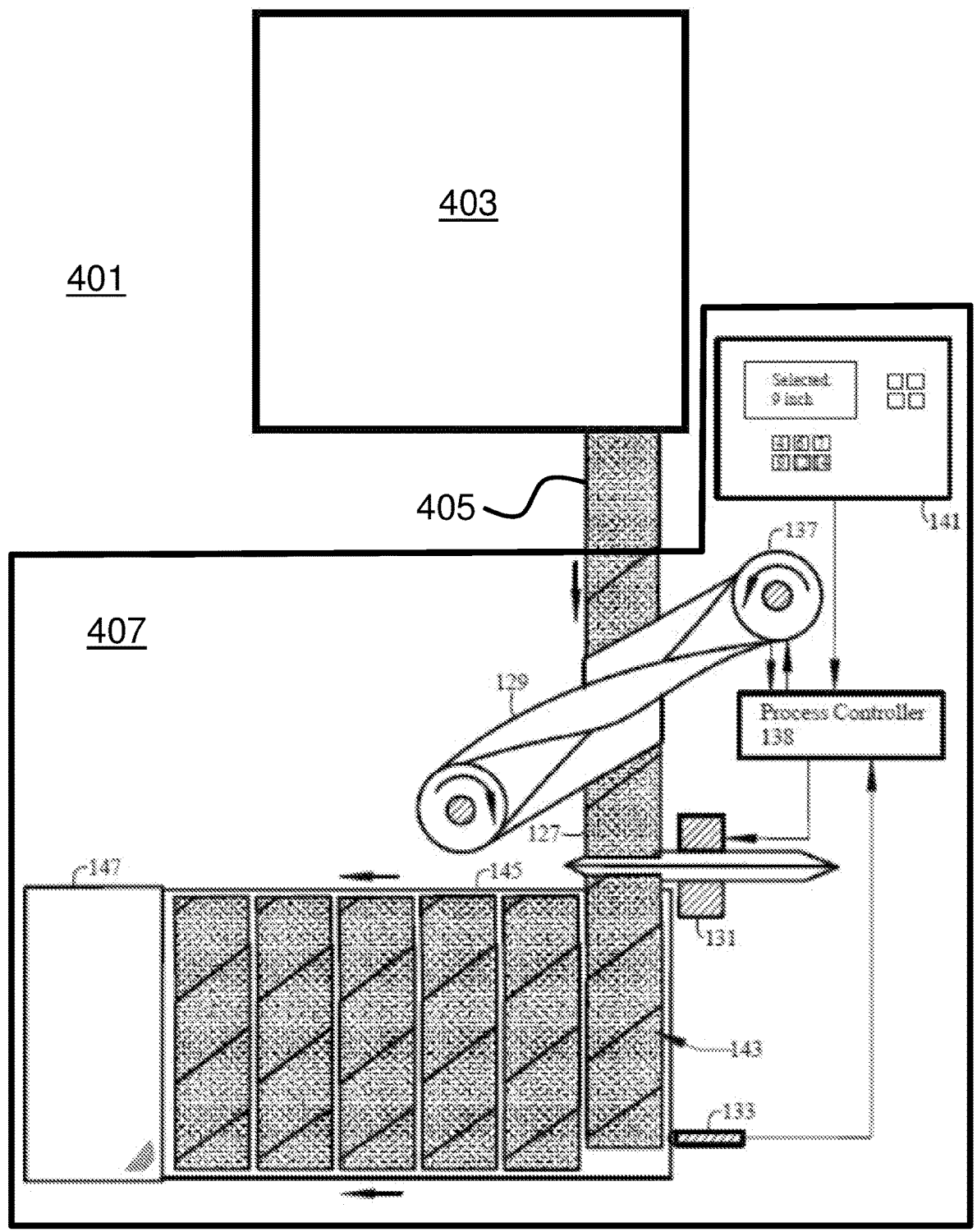
FIG. 4 shows a schematic diagram of a process for manufacturing paint rollers in accordance with an embodiment wherein paint rollers are manufactured and cut to final length.

FIG. 4 shows a schematic view of a process 401 for manufacturing paint rollers in accordance with an embodiment wherein paint rollers are manufactured and cut to final length. As shown in FIG. 4, uncut paint roller tubes 405 may be manufactured by any paint roller manufacturing process 403. The paint roller manufacturing process 403 may be a continuous process or a batch process. The paint roller tubes 405 may be supplied continuously or in a batch-wise manner to a finishing section 407 of the process 401. The paint roller tubes 405 may be cut into finished lengths in finishing section 407 as described according to any of the other embodiments described herein.

Any paint roller manufacturing process 403 may be used. The examples below are neither limiting nor exhaustive. The paint roller tubes 405 may comprise any combination of materials and may be manufactured by any process.

Paint roller tubes may be made with sufficiently rigid paper or paper-like material. These tubes are typically made from several plys of paper that are fed into a process that winds there plys around a mandrel. The paper is pre-treated with adhesive, and/or an adhesive is dripped or extruded upon the paper strips, binding the plys to each other and to the fabric which is applied later in the process. The resulting tube moves forward due to the motion created from the spiral winding process. Spirally-wound paint roller tubes may be produced in a separate process, and then fabric may be wound around the tubes in a subsequent process. The tubes may then be cut to desired lengths.

Paint roller tubes may be made of pre-formed tubes of thermoplastic material. This material may be made of polypropylene or PVC, for instance. The pre-formed tubes may be made of continuously-extruded material, or may be made of strips of material that are wound around a mandrel using a spiral winding process. The pre-formed tubes are loaded onto a mandrel, and are then rotated and moved forward by a spiral winding process. Fabric is applied to the tube via the same spiral winding process, and the fabric is secured either via a resin made of thermoplastic material or an adhesive that is extruded on the tube, or via heating the tube at the point at which the fabric is applied so that the plastic material that the tube at that point is made of is sufficiently heated to create adhesion between the heated surface and the fabric. The resulting fabric-coated tube is then cut to desired lengths.

Paint roller tubes may be made tubes of thermoplastic material that are extruded from an extruder. The die from which the tube is extruded rotates, imparting rotational and forward motion to the tube. A resin is extruded upon the tube, and fabric is then wound around the resin-coated tube. The resulting fabric-coated tube is then cut to desired lengths.

Paint roller tubes may be made of pre-formed tubes of thermoplastic material. This material may be made of polypropylene or PVC, for instance. The pre-formed tubes may be made of continuously-extruded material, or may be made of strips of material that are wound around a mandrel using a spiral winding process. The tubes are then joined together using tape or some other adhesive, and are then rotated via a spiral winding process. A resin made of molten thermoplastic or an adhesive is extruded onto the tube, and fabric is then wound onto the tube via a spiral winding process, which also moves the tube forward. The resulting fabric-covered tube is then cut into desired lengths.

Paint roller tubes may be made via a spiral winding process. One or more strips of thermoplastic material are wound around a mandrel via a spiral winder. The strips may be extruded inline, or may be pre-formed. A resin or adhesive is extruded onto the strip(s), and fabric is wound using the spiral winder shortly thereafter. The resin/adhesive binds the strips to each other (if multiple plys are used), and the strip(s) to the fabric. The resulting paint roller tube is then cut into desired lengths.

FIG. 5 is a block diagram that illustrates a computer system 500 upon which an embodiment of the invention may be implemented. Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of one or more methods described herein.

A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitutes computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

Information, including instructions, is provided to the bus 510 for use by the processor from an external input device 512, such as a keyboard containing alphanumeric keys operated by a human user, or a sensor. A sensor detects conditions in its vicinity and transforms those detections into signals compatible with the signals used to represent information in computer system 500. Other external devices coupled to bus 510, used primarily for interacting with humans, include a display device 514, such as a cathode ray tube (CRT) or a liquid crystal display (LCD), for presenting images, and a pointing device 516, such as a mouse or a trackball or cursor direction keys, for controlling a position of a small cursor image presented on the display 514 and issuing commands associated with graphical elements presented on the display 514.

In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 570 sends and receives electrical, acoustic or electromagnetic signals, including infrared and optical signals, that carry information streams, such as digital data.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 502, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 502, except for carrier waves and other signals.

Logic encoded in one or more tangible media includes one or both of processor instructions on a computer-readable storage media and special purpose hardware, such as ASIC 520.

Network link 578 typically provides information communication through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides information representing video data for presentation at display 514.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520, may be used in place of or in combination with software to implement the invention. Thus, embodiments of the invention are not limited to any specific combination of hardware and software.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server 592 transmits program code for a particular application, requested by a message sent from computer 500, through Internet 590, ISP equipment 584, local network 580 and communications interface 570. The received code may be executed by processor 502 as it is received or may be stored in storage device 508 or other non-volatile storage for later execution, or both. In this manner, computer system 500 may obtain application program code in the form of a signal on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red a carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
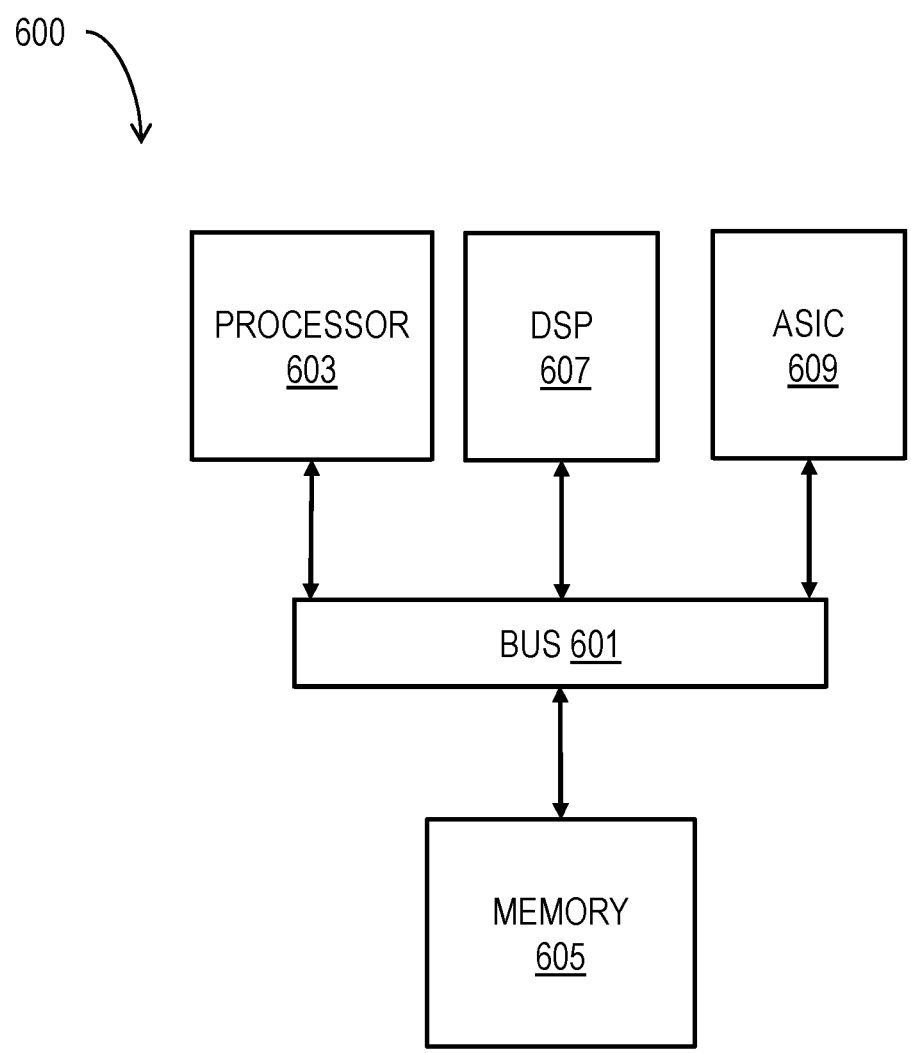
FIG. 6 illustrates a chip set upon which an embodiment of the invention may be implement.

FIG. 6 illustrates a chip set 600 upon which an embodiment of the invention may be implemented. Chip set 600 is programmed to perform one or more steps of a method described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of a method described herein.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively, or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 605 also stores the data associated with or generated by the execution of one or more steps of the methods described herein.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, and especially within the claims, ordinal terms such as first and second are not intended, in and of themselves, to imply sequence, time or uniqueness, but rather are used to distinguish one claimed construct from another. In some uses where the context dictates, these terms may imply that the first and second are unique. For example, where an event occurs at a first time, and another event occurs at a second time, there is no intended implication that the first time occurs before the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

What is claimed is:

1. A method for manufacturing paint rollers, the method comprising:
using a precision measuring or sensing device to control a cutting device causing the cutting device to cut an advancing paint roller tube into pre-selected lengths prior to the paint roller tube hardening and setting; and
allowing the cut lengths to harden and set into final paint rollers having final paint roller lengths.

2. The method for manufacturing paint rollers according to claim 1, wherein the final paint roller lengths measured axially are three inches, four inches, four and a half inches, six inches, six and a half inches, seven inches, nine inches, twelve inches, fifteen inches, or eighteen inches.

3. The method for manufacturing paint rollers according to claim 1, further comprising:
winding at least one strip of material about a mandrel, the at least one strip of material comprising a polymeric material and a filler.

4. The method for manufacturing paint rollers according to claim 3, wherein the polymeric material comprises a thermoplastic, a thermoset, an elastomer, a copolymer thereof, and/or a blend thereof.

5. The method for manufacturing paint rollers according to claim 3, wherein the filler comprises Alumina Trihydrate, Barium Sulfate, Calcium Carbonate, Carbon Black, Diatomaceous earth, Dolomite, Halloysite, Kaolin, Magnetite/Hematite, Magnesium Hydroxide, Mica, Silica, Talc, Titanium Dioxide, Wollastonite, and/or Zinc Oxide.

6. The method for manufacturing paint rollers according to claim 3, wherein the filler is present in an amount of from about 10 to about 70% by weight.

7. The method for manufacturing paint rollers according to claim 3, wherein the polymeric material and the filler are present in a ratio that results in a final paint roller which shrinks axially by less than 2.5 percent of the final paint roller axial length upon hardening and setting.

8. The method for manufacturing paint rollers according to claim 3, wherein the polymeric material and the filler are present in a ratio that results in final paint roller shrinkage which varies by less than 0.1 percent per final paint roller axial length.

9. The method for manufacturing paint rollers according to claim 3, wherein the polymeric material and the filler are present in a ratio that results in final paint roller shrinkage of less than 0.05 percent per final paint roller axial length.

10. The method for manufacturing paint rollers according to claim 3, further comprising: applying an adhesive to at least a portion of the at least one strip as it is wound about the mandrel.

11. The method for manufacturing paint rollers according to claim 10, wherein the adhesive comprises a combination of the polymeric material and the filler.

12. The method for manufacturing paint rollers according to claim 11, wherein, the combination has an effective melt flow rate (MFR) within the range of from about 80 to about 170 g/10 min.

13. The method for manufacturing paint rollers according to claim 1, wherein the cutting device comprises a rotary cutter.

14. The method for manufacturing paint rollers according to claim 1, wherein the cutting device comprises a travelling saw or a stationary saw.

15. The method for manufacturing paint rollers according to claim 1, wherein the step of using the precision device to control the cutting device results in cutting the paint roller tube into desired axial lengths with a tolerance lower than +/−0.01 inches per final paint roller length.

16. The method for manufacturing paint rollers according to claim 1, wherein the step of using the precision device to control the cutting device results in cutting the paint roller tube into desired axial lengths online with a tolerance lower than +/−0.005 inches.

17. The method for manufacturing paint rollers according to claim 1, wherein the step of using the precision device to control the cutting device results in cutting the paint roller tube into desired axial lengths online with a tolerance of +/−0.0025 inches.

18. The method for manufacturing paint rollers according to claim 1, wherein the step of using the precision device to control the cutting device is performed when an exterior surface of the advancing paint roller tube has a temperature that is more than 90 degrees Fahrenheit.

19. The method for manufacturing paint rollers according to claim 1, further comprising a step of changing the pre-selected lengths from one of a plurality of preset lengths to another of the plurality of preset lengths by operating a device in operative communication with the cutting device or the precision device.

20. The method for manufacturing paint rollers according to claim 19, wherein the plurality of preset lengths comprises at least two of: three inches, four inches, four and a half inches, six inches, six and a half inches, seven inches, nine inches, twelve inches, fifteen inches, and eighteen inches.

21. The method for manufacturing paint rollers according to claim 3, further comprising:
winding a length of fabric about the at least one strip to form a paint roller tube; and
applying compression to the paint roller tube while advancing the paint roller tube in a direction parallel to the mandrel.

22. The method for manufacturing paint rollers according to claim 21, wherein the step of winding a length of fabric about the at least one strip comprises winding a length of coated fabric about at least an outer strip.

23. The method for manufacturing paint rollers according to claim 1, wherein the method is a continuous process.

24. The method for manufacturing paint rollers according to claim 1, wherein the method is a batch-wise process.

25. The method for manufacturing paint rollers according to claim 1, wherein the advancing paint roller tube is manufactured from a material selected from the group consisting of paper, a paper-like material, an extruded material, and combinations thereof.

26. The method for manufacturing paint rollers according to claim 1, wherein the advancing paint roller tube is manufactured by a process selected from a continuous extrusion process, a spiral-winding process, and combinations thereof.

27. The method for manufacturing paint rollers according to claim 3, wherein the polymeric material comprises polypropylene.

28. The method for manufacturing paint rollers according to claim 3, wherein the filler comprises calcium carbonate.

* * * * *